(12) United States Patent
Vega (10) Patent No.: US 12,179,530 B2
(45) Date of Patent: Dec. 31, 2024

(54) TELESCOUPLER

(71) Applicant: Roadclipper Enterprises, Inc. d/b/a Diamond C Trailers, Mt. Pleasant, TX (US)

(72) Inventor: Valentine Vega, Mount Pleasant, TX (US)

(73) Assignee: Roadclipper Enterprises, Inc., Mt. Pleasant, TX (US)

( * ) Notice: Subject to any disclaimer, the term of this patent is extended or adjusted under 35 U.S.C. 154(b) by 0 days.

(21) Appl. No.: 16/952,246

(22) Filed: Nov. 19, 2020

(65) Prior Publication Data

US 2022/0153071 A1    May 19, 2022

(51) Int. Cl.
*B60D 1/46* (2006.01)

(52) U.S. Cl.
CPC ...................... *B60D 1/46* (2013.01)

(58) Field of Classification Search
CPC .......... B60D 1/155; B60D 1/015; B60D 1/46; B60D 1/065; B60D 1/36; B62D 53/0807; B62D 53/0828
USPC .......... 280/490.1, 417.1, 425.2, 441.2, 491.2
See application file for complete search history.

(56) References Cited

U.S. PATENT DOCUMENTS

| | | | | |
|---|---|---|---|---|
| 3,181,881 A | * | 5/1965 | Van .................... | B60D 1/155 280/142 |
| 3,527,476 A | * | 9/1970 | Winckler ............ | B62D 53/0828 280/901 |
| 3,889,978 A | * | 6/1975 | Kann .................. | B62D 53/0828 280/901 |
| 4,169,611 A | * | 10/1979 | Smith ................... | B60D 1/155 280/482 |
| 4,796,864 A | * | 1/1989 | Wilson ..................... | B60S 9/08 254/425 |
| 4,832,358 A | * | 5/1989 | Bull ..................... | B62D 53/061 280/491.5 |
| 5,520,360 A | * | 5/1996 | Wensman ............ | F16M 11/046 248/188.5 |

(Continued)

OTHER PUBLICATIONS

Written Opinion of the International Search Authority, PCT/US2021/058736, Jan. 31, 2022.

(Continued)

*Primary Examiner* — Anne Marie M Boehler
(74) *Attorney, Agent, or Firm* — Harper & Bates LLP; Scott L. Harper (57) ABSTRACT

A trailer telecoupler that includes an outer housing partially enclosing a primary leg, the primary leg partially enclosing a portion of a secondary leg and a trailer hitch coupler detachably secured to one end of the secondary leg. The outer housing includes one or more bolt holes dimensionally spaced on adjacent first and second sidewalls of the housing. The primary leg includes one or more bolt holes dimensionally spaced on adjacent first and second sidewalls of the primary leg. The secondary leg includes one or more bolt holes dimensionally spaced on adjacent first and second sidewalls of the secondary leg. One or more nut holders are positioned within the interior portions of the primary and/or secondary legs in line with the desired bolt holes located along the adjacent sidewalls of the primary and/or secondary legs and aligned through which one or more bolts are inserted at least one nut holder and secured to fix the outer housing and primary leg.

19 Claims, 9 Drawing Sheets

(56) References Cited

U.S. PATENT DOCUMENTS

| | | | | |
|---|---|---|---|---|
| 6,234,509 B1 * | 5/2001 | Lara | B62D 53/0828 | 280/475 |
| 6,366,313 B1 * | 4/2002 | Hall | A47B 91/005 | 248/188.5 |
| 6,874,764 B2 * | 4/2005 | Drake, III | B60S 9/08 | 254/420 |
| 7,789,426 B2 * | 9/2010 | Hanscom | B60P 3/36 | 280/763.1 |
| 7,878,524 B1 * | 2/2011 | Hemmingsen | B62D 53/062 | 280/415.1 |
| 7,954,839 B2 * | 6/2011 | Quiring | B60D 1/143 | 280/441.2 |
| 8,286,986 B2 * | 10/2012 | Drake | B60D 1/46 | 280/490.1 |
| 10,625,716 B2 * | 4/2020 | Jones | B60S 9/22 | |
| D931,152 S * | 9/2021 | Rabska | D12/162 | |
| 2003/0001362 A1 * | 1/2003 | Ebey | B60D 1/065 | 280/490.1 |
| 2003/0047908 A1 * | 3/2003 | Lara | B60D 1/065 | 280/441.2 |
| 2004/0195801 A1 * | 10/2004 | Lara | B60D 1/065 | 280/490.1 |
| 2008/0129011 A1 * | 6/2008 | Bouwkamp | B60D 1/015 | 280/490.1 |
| 2008/0292390 A1 * | 11/2008 | Walstrom | B60D 1/40 | 280/479.3 |
| 2012/0211966 A1 * | 8/2012 | Drake | B60D 1/488 | 280/507 |
| 2012/0261904 A1 * | 10/2012 | Arends | B60D 1/363 | 280/507 |
| 2013/0277944 A1 * | 10/2013 | Drake | B60D 1/06 | 280/490.1 |
| 2015/0217608 A1 * | 8/2015 | Rabska | B60D 1/46 | 280/441.2 |
| 2018/0126809 A1 * | 5/2018 | Chapin | B60D 1/246 | |
| 2020/0223674 A1 * | 7/2020 | Zimmerman | B66F 3/25 | |

OTHER PUBLICATIONS

Patent Cooperation Treaty (PCT) International Search Report, PCT/US2021/058736, Jan. 31, 2022.

* cited by examiner

TELESCOUPLER

TECHNICAL FIELD

The present disclosure relates to a telecoupler, and more particularly, to a telescoping trailer coupler for attaching a trailer to vehicles, with different trailer hitch heights, with a compatible trailer coupler hitch receiver. The present disclosure also relates to a method of extending and retracting a telescoping trailer coupler.

BACKGROUND

Trailer couplers are used in many trailer related applications to couple trailers of various tongue designs to vehicles or other industrial equipment. Trailers come in various designs such as enclosed and flatbed configurations and each configuration requires a different tongue design to provide dimensional compatibility with the trailering vehicle trailer hitch height. Trailer tongues come in various designs including flat and gooseneck tongue designs to accommodate a variety of tow vehicle hitch heights, but in many instances and notably the 30,000 lb plus classifications, offer little or no adjustability in tongue height relative to the trailering vehicle trailer hitch height.

SUMMARY

The present disclosure is directed to a telescoping telecoupler that includes an outer housing partially enclosing a primary leg, the primary leg partially enclosing a portion of a secondary leg with a movable collar and trailer hitch coupler detachably secured to one end of the secondary leg. The outer housing includes one or more bolt holes dimensionally spaced on adjacent first and second sidewalls of the housing. The primary leg includes one or more bolt holes dimensionally spaced on adjacent first and second sidewalls of the primary leg. The secondary leg includes one or more bolt holes dimensionally spaced on adjacent first and second sidewalls of the secondary leg. One or more nut receivers are positioned within the interior portions of the primary and secondary legs in line with the desired bolt holes located along the adjacent sidewalls of the interior of the primary and/or secondary legs and aligned through which one or more bolts are inserted at least one nut holder and secured to fix the outer housing, primary leg, and secondary leg in the desired position and secure the telecoupler assembly in a fixed manner for trailering operations.

In an implementation, the primary leg may telescope into or out of a portion of the outer housing by aligning the desired bolt holes located along the adjacent sidewalls of the outer housing and primary leg and through which one or more bolts are inserted through and into at least one threaded nut of the nut holder and secured to fix the outer housing and primary leg in the desired position and secure the telecoupler assembly in a fixed manner.

In an implementation, the secondary leg may telescope into or out of a portion of the primary leg by aligning the desired bolt holes located along the adjacent sidewalls of the primary and secondary legs and a collar, and through which one or more bolts are inserted and through and into at least one threaded nut of the nut holder and secured to fix the primary leg and secondary leg in the desired position and secure the telecoupler assembly in a fixed manner.

In yet another implementation, the present disclosure is directed to a method of using a telecoupler to extend or retract the height of a trailer tongue. The method may comprise extending or retracting, a primary leg, a secondary leg, or a primary and secondary leg to the desired length and securing the primary leg, the secondary leg, or the primary and secondary leg in a fixed position with one or more bolts coupled to one or more threaded nuts in a nut holder. The various embodiments of the telecoupler presented herein may be manufactured from A36 steel or other metal alloys as known in the art.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which.

Like reference symbols in the various drawings indicate like elements.

DETAILED DESCRIPTION

The present invention provides a telecoupler that attaches to the gooseneck of a trailer to provide a means for support and positioning of a trailer for trailering operations. The telecoupler provides the ability to extend or retract one or more telescoping legs and fix their position with one or more bolts. This allows the user to raise or lower the height of the trailer gooseneck or tongue in order to make a safe and proper connection between the trailer and vehicle connected to the trailer.

Figure 1:
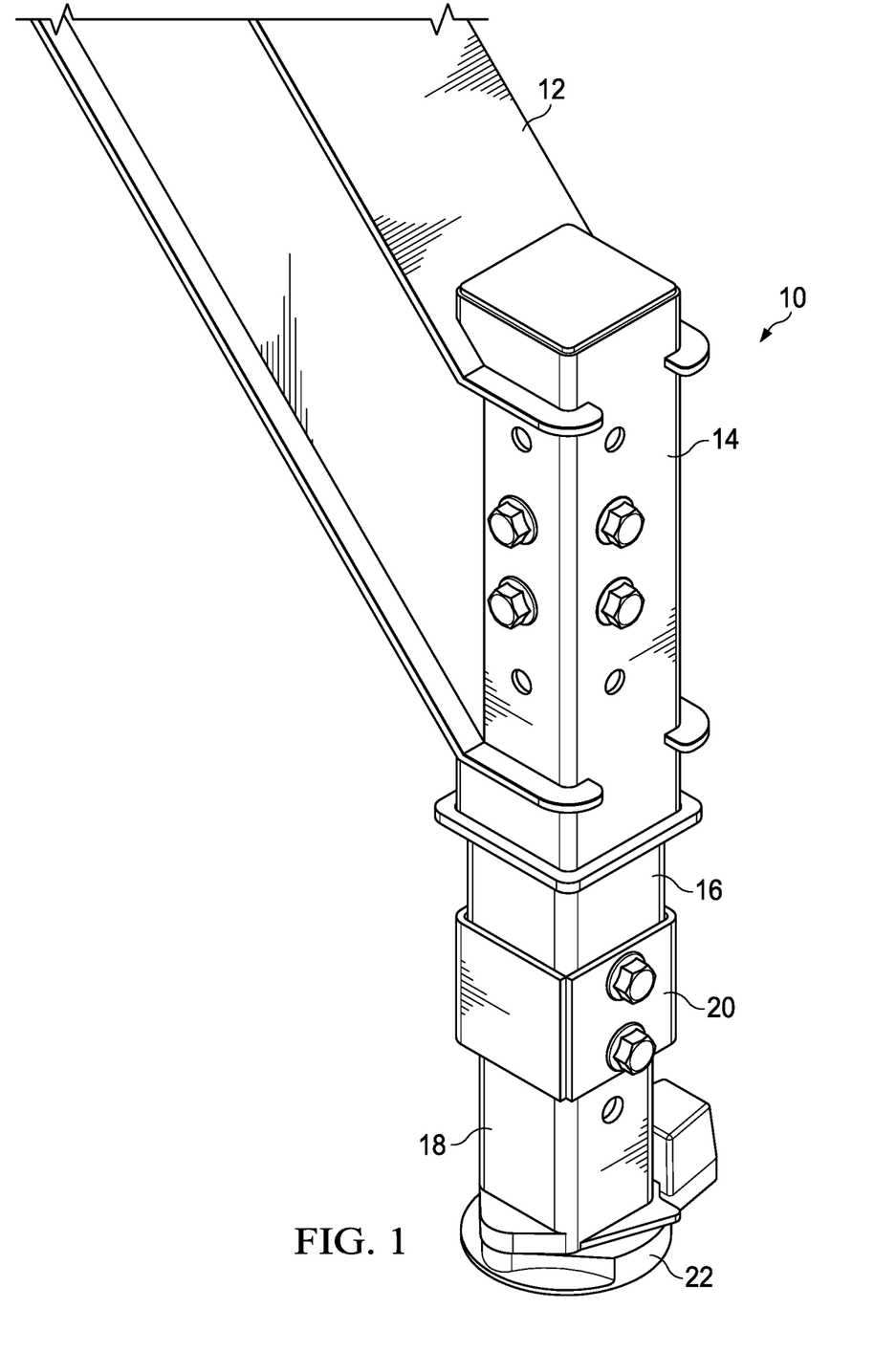
FIG. 1 illustrates a front perspective view of an implementation of a telecoupler according to the present disclosure.

Referring now to the drawings, where like reference numerals represent like components, FIG. 1 illustrates a front perspective view of an implementation of a telecoupler 10 according to the present disclosure. The telecoupler 10 comprises an outer housing 14 in which a partial length of primary leg 16 is enclosed on one end. Secondary leg 18 is enclosed on one end in a portion of primary leg 16 and trailer coupler 22 is detachably secured to the opposite end of secondary leg 18. Collar 20 is in slidable mechanical communication with a portion of primary leg 16 and secondary leg 18 and provides a mechanism for fixing primary leg 16 and secondary leg 18 in a secured position. Telecoupler 10 is shown attached to a typical trailer gooseneck 12 for use with gooseneck trailers.

Figure 2A:
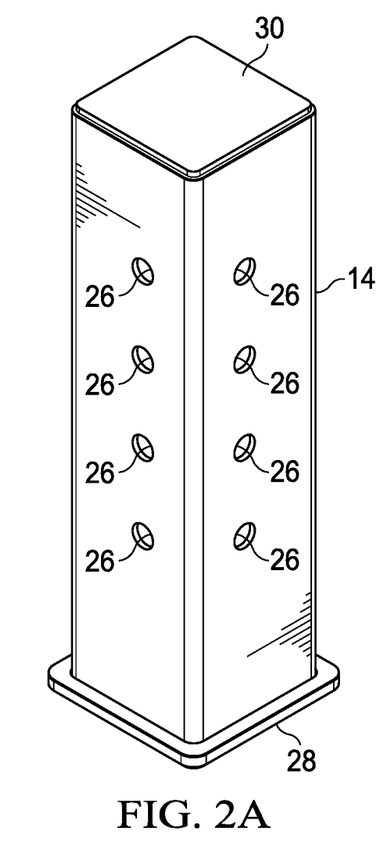
FIGS. 2A and 2B illustrate a front perspective and front plan view of an outer housing of the telecoupler of FIG. 1 according to the present disclosure.
Figure 2B:
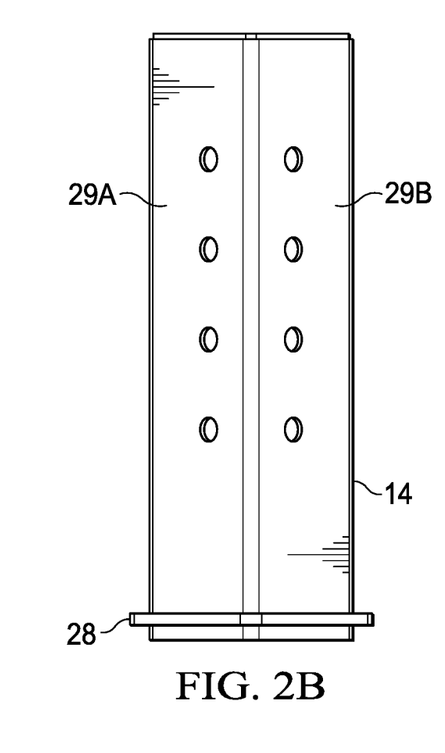

FIGS. 2A and 2B illustrate a front perspective and front plan view of an outer housing 14 of the telecoupler 10. Outer housing 14 is depicted in a generally square, box tube design with a cap 30 on one end of outer housing 14. In an embodiment, outer housing 14 is manufactured from A36 steel which is $3/16$ inches in thickness. Bolt holes 26 are spaced dimensionally along adjacent first sidewall 29A and second sidewall 29B of outer housing 14. The diameter and spacing of bolt holes 26 along the length of outer housing 14 may be varied according to the operational or trailering environment as may be required from time to time. The outer housing reinforcement ring 28 is welded or formed proximate near an end of outer housing 14 to provide a terminal stop for collar 20 (not shown) in case of a bolt failure associated with the secondary leg portion of the telecoupler 10.

Figure 3:
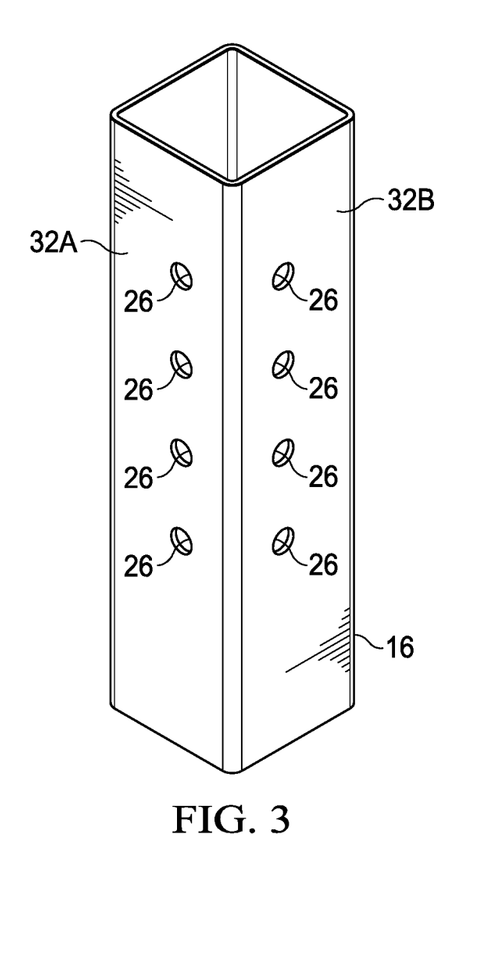
FIG. 3 illustrates a front perspective view of a primary leg of the telecoupler of FIG. 1 according to the present disclosure.

FIG. 3 illustrates a front perspective view of primary leg 16 of the telecoupler 10. Primary leg 16 is depicted in a generally square, box tube design dimensioned so as to be capable of being partially enclosed within the interior of outer housing 14. In an embodiment, primary leg 16 is manufactured from A36 steel with a thickness of $3/16$ inches in thickness. Bolt holes 26 are spaced dimensionally along adjacent first sidewall 32A and second sidewall 32B of primary leg 16. The diameter and spacing of bolt holes 26 along the length of primary leg 16 may be varied according to the operational or trailering environment as may be required from time to time.

Figure 4:
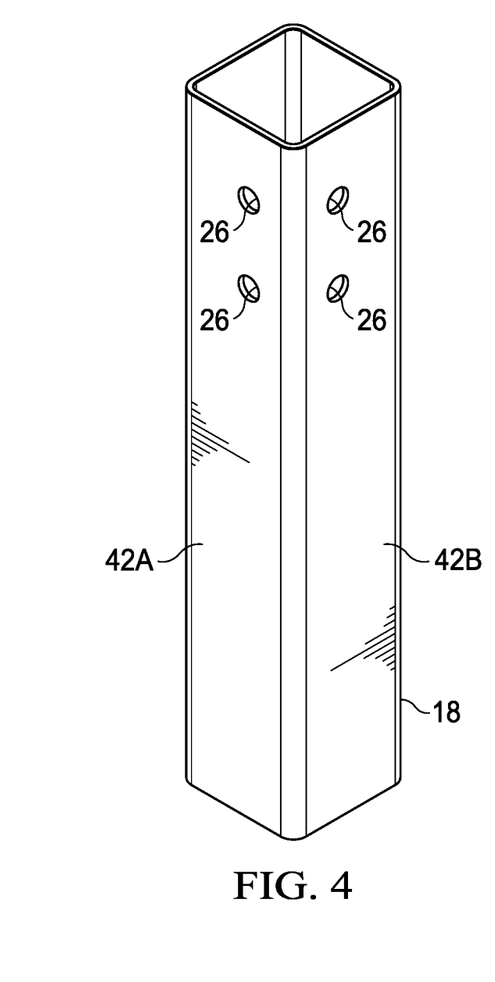
FIG. 4 illustrates a front perspective view of a secondary leg of the telecoupler of FIG. 1 according to the present disclosure.

FIG. 4 illustrates a front perspective view of a secondary leg 18 of the telecoupler 10. Secondary leg 18 depicted in a generally square, box tube design dimensioned so as to be capable of being partially enclosed within the interior of primary leg 16. Bolt holes 26 are spaced dimensionally along adjacent first sidewall 42A and second sidewall 42B of secondary leg 18. The diameter and spacing of bolt holes 26 along the length of secondary leg 18 may be varied according to the operational or trailering environment as may be required from time to time.

Figure 5A:
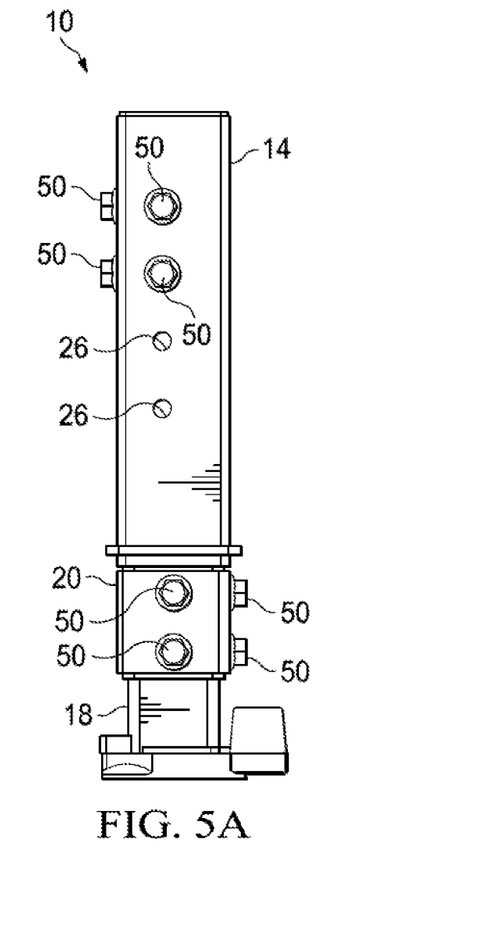
FIGS. 5A-5D illustrates a plan view of the telecoupler with the primary leg extended, and primary and secondary legs depicted in various extended positions demonstrating the telescoping functionality of the telecoupler of FIG. 1 according to the present disclosure.
Figure 5B:
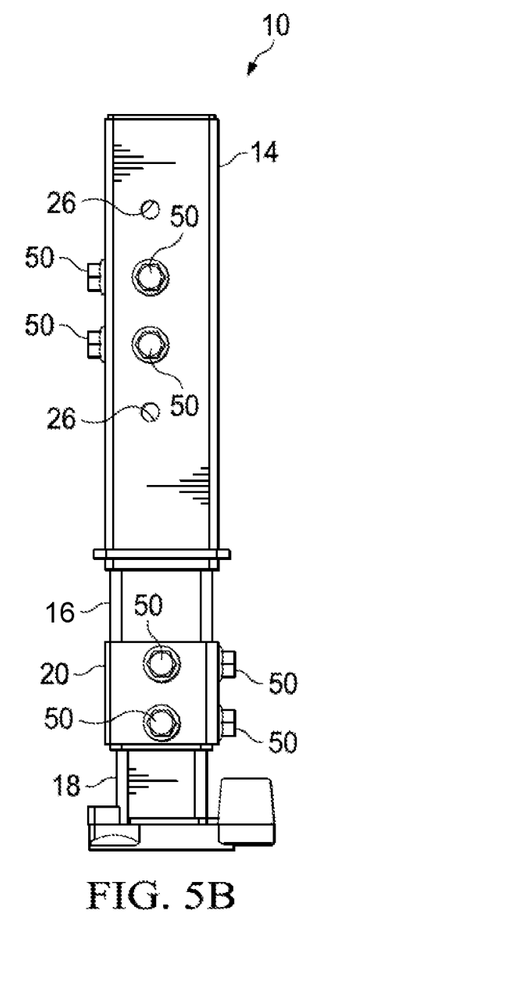
Figure 5C:
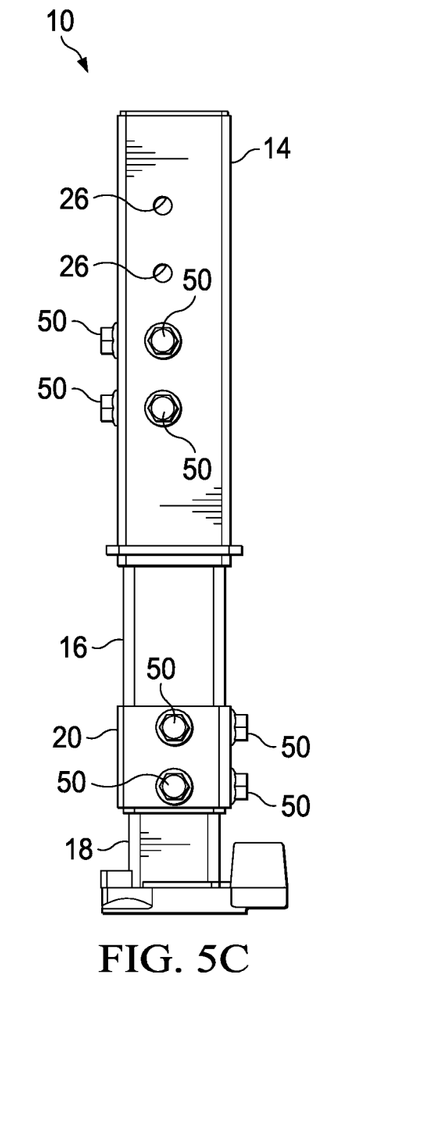
Figure 5D:
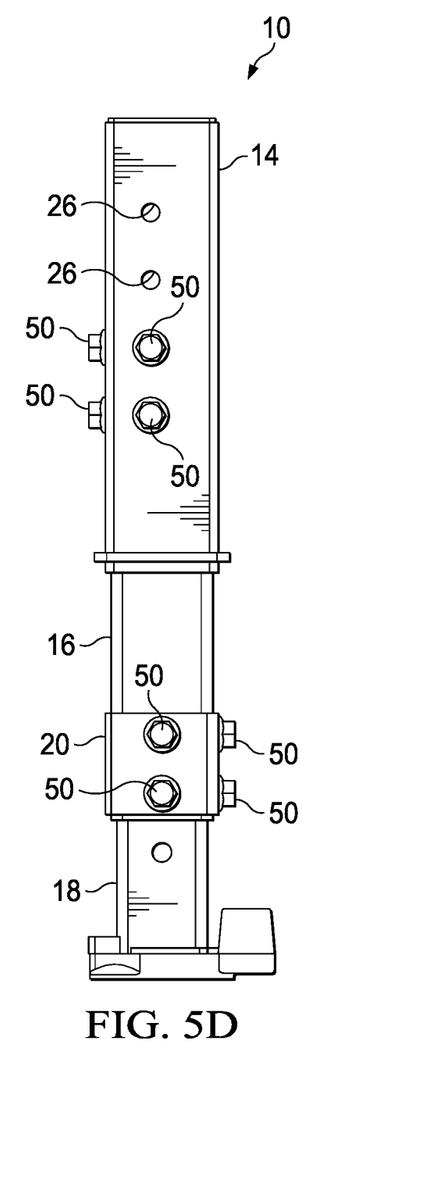

FIGS. 5A-5D illustrate the telecoupler 10 in various operational modes. FIG. 5A shows the telecoupler 10 in a fully retracted position. In this position, bolts 50 are positioned through bolt holes 26 located near a distal end of the outer housing thereby for fixing a portion of the primary leg 16 within the interior of the outer housing 14. Similarly, bolts 50 are secured through bolt holes 26 (not shown) located near in the secondary leg 18 thereby fixing a portion of the secondary leg 18 within the interior of the primary leg 16. Collar 20 is fixed in position relative to secondary leg 18 with bolts 50 inserted through bolt holes 26 (not shown). FIGS. 5B and 5C depict lengthening extensions of the primary leg 16 leg length relative to the outer housing 14 by securing the bolts 50 through bolt different bolt holes 26 as shown. FIG. 5D depicts the telecoupler in a fully extended position. In this position, bolts 50 are positioned through bolt holes 26 located nearer the opposite end of the primary leg 16, while still enclosing and fixing a portion of the primary leg within the remaining portion of the outer housing 14. Similarly, bolts 50 are secured through bolt holes 26 (not shown) located near the opposite end of the secondary leg 18 thereby enclosing and fixing a portion of the secondary leg 18 within the interior of the primary leg 16. Collar 20 is fixed in position relative to the primary leg 16 and secondary leg 18 with bolts 50 inserted through bolt holes 26 (not shown).

Figure 6A:
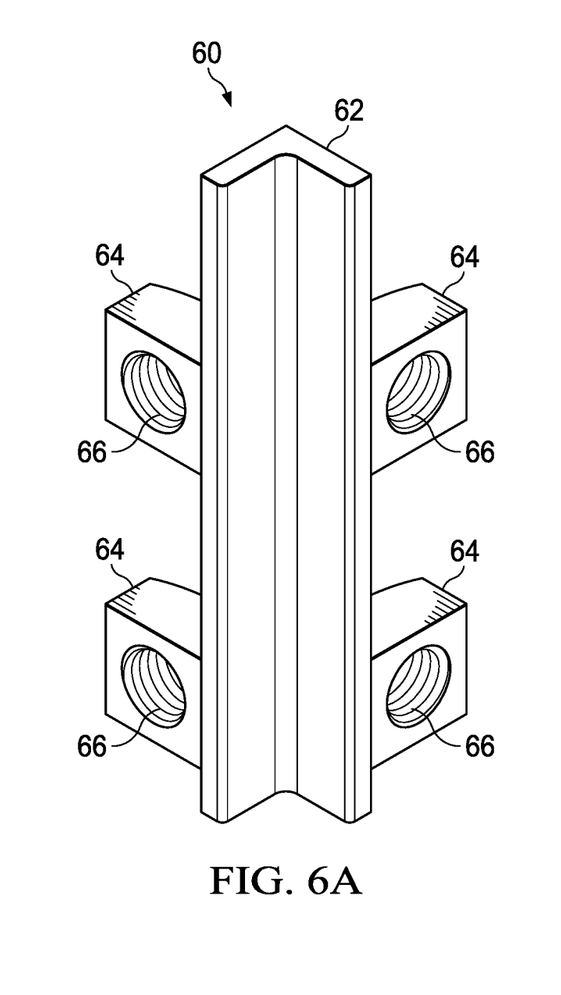
FIGS. 6A and 6B are back and front perspective views of the nut holder used in connection with the telecoupler of FIG. 1 according to the present disclosure.
Figure 6B:
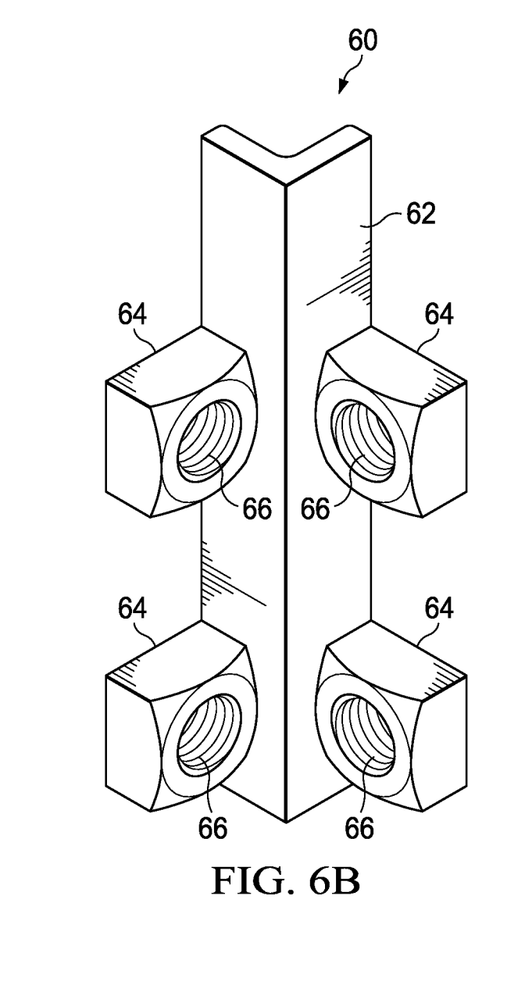

Turning to FIGS. 6A and 6B, back and front perspective views of the nut holder 60 used in connection with the telecoupler are shown. The nut holder 60 comprises a stem 62 to which one or more threaded nuts 64 are secured and dimensionally spaced apart similar to the dimensional spacing of bolt holes 26 along the lengths of the outer housing 14, primary leg 16 and secondary leg 18. Nut holder 60 operates to receive bolts 50 which are inserted through bolt holes 26 along the lengths of the outer housing 14, primary leg 16, secondary leg 18 and collar 20.

Figure 7A:
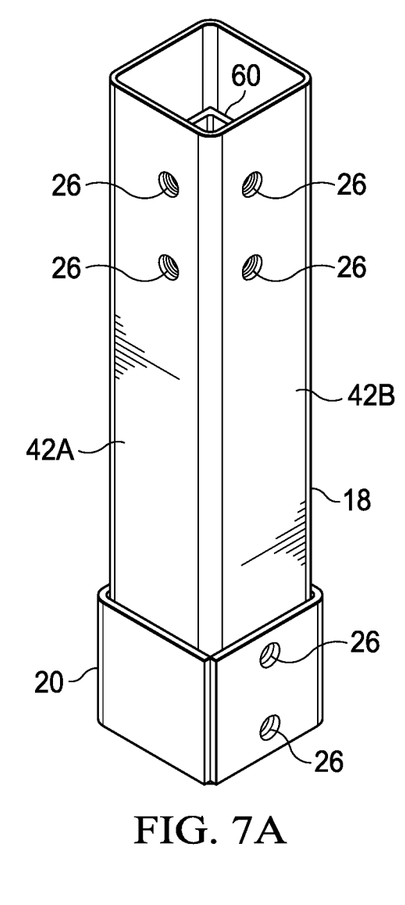
FIGS. 7A-7C are various views of the secondary leg depicting the positioning of a nut holder in the interior portion of the secondary leg in connection with the telecoupler of FIG. 1 according to the present disclosure.
Figure 7B:
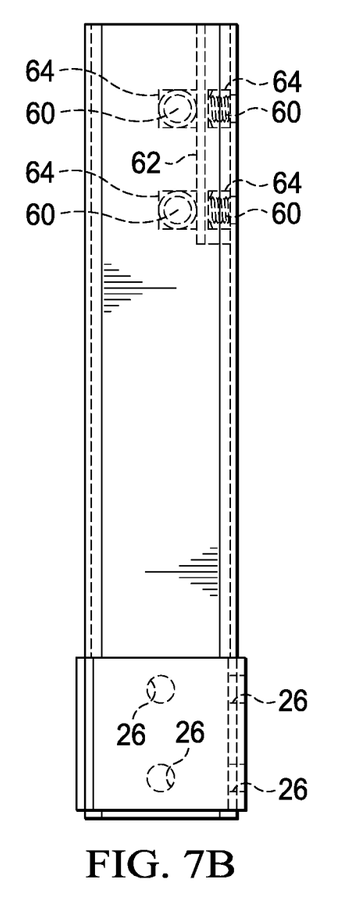
Figure 7C:
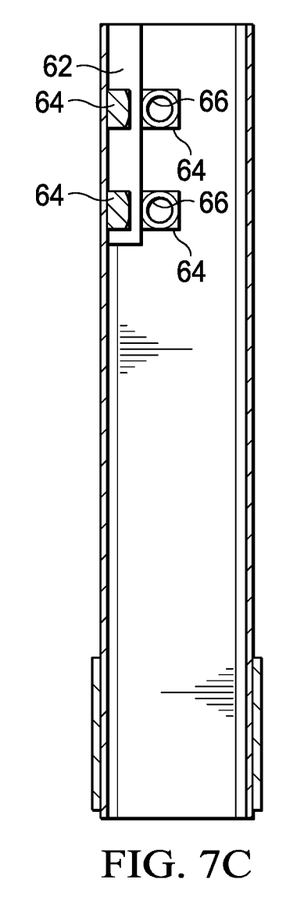

FIGS. 7A-7C are various views of the secondary leg 18 depicting the positioning of a nut holder 60 within the interior portion of the secondary leg 18 in connection with the telecoupler 10. FIGS. 7A and 7B show the dimensional spacing of bolt holes 26 along a portion of secondary leg 18 to which the threaded nut bolt holes 66 are aligned so as to enable receipt of bolts 50 through bolt holes located in the primary housing 14 or collar 20. Nut holder 60 may be welded, positioned by hand or otherwise secured as is known in the art to the adjacent first secondary leg sidewall 42A and second secondary leg sidewall 42B as shown. Multiple nut holders 60 may be secured or positioned in similar fashion along interior adjacent sidewalls in the primary leg 16 in various contemplated embodiments. FIG. 7C is a side cutaway view depicting the nut holder 60 secured or otherwise positioned in the interior portion of the secondary leg 18. Nut holder 60 comprises stem 62 to which threaded nuts 64 are secured and dimensionally spaced apart similar to the dimensional spacing of bolt holes 26 along one or more of the lengths of the outer housing 14, primary leg 16 and secondary leg 18. Nut holder 60 may be welded, positioned by hand or otherwise secured as is known in the art to the adjacent first secondary leg interior sidewall 42A and second secondary leg interior sidewall 42B as shown. In this depiction, bolt holes 26 are shown within the periphery of threaded nuts 64.

Figure 8:
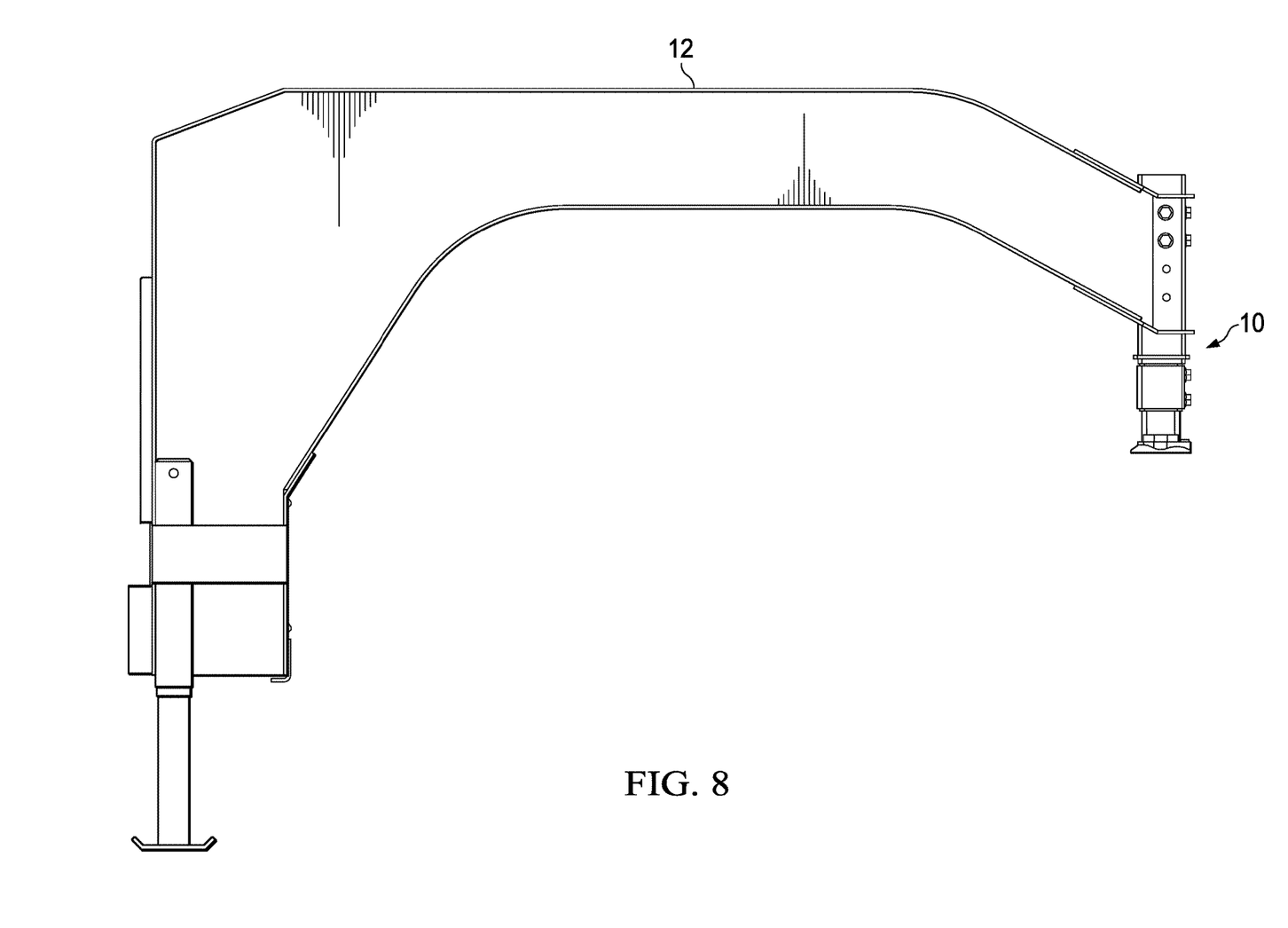
FIG. 8 is a side view of the telecoupler attached to a trailer gooseneck, the telecoupler shown in the fully retracted position.
Figure 9:
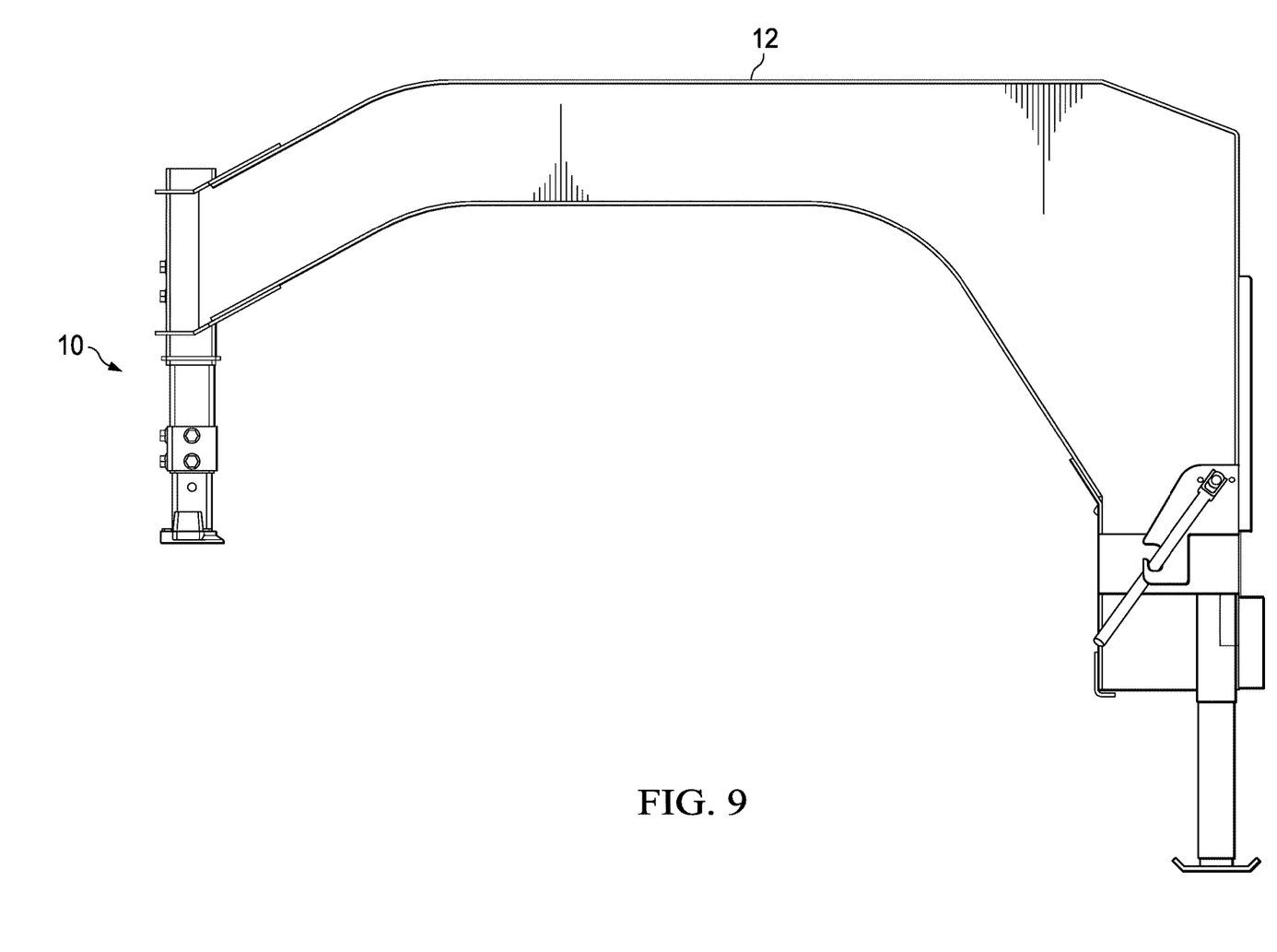
FIG. 9 is a side view of the telecoupler attached to a trailer gooseneck, the telecoupler shown in the fully extended position.

Turning to FIGS. 8 and 9, FIG. 8 is a side view of the telecoupler attached to a trailer gooseneck 12, the telecoupler 10 shown in the fully retracted position and FIG. 9 shows the telecoupler 10 in the fully extended position. As previously discussed, it is an object of this invention to provide an apparatus and method by which a telecoupler may be shortened or lengthened to accommodate dimensional differences in trailer tongue and trailering vehicle dimensions and geometries which affect the efficiency and safety of trailering activities. The invention provided herein provides and effective and easily adjustable trailer telecoupler apparatus and method. In an embodiment, the telescopic ability of the telecoupler provides the ability to lengthen or retract over a range of 8 inches providing the ability to couple a trailer fitted with the telecoupler to be used in connection with a variety of trailering vehicles with coupling heights varying in the 8-inch range. In one implementation, the inner and the primary and secondary legs may be manufactured from A36 steel which is $3/16$ inches in thickness and the reinforcement ring 28 welded around the outer housing 14 is $3/8$ inch in thickness.

It is also to be understood that the terminology used herein is for the purpose of describing particular implementations only and is not intended to be limiting. As used in this specification, the singular forms "a", "an" and "the" include plural referents unless the content clearly indicates otherwise. As another example, "coupling" includes direct and/or indirect coupling of members.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A trailer telecoupler apparatus comprising:
    an outer housing with a first sidewall, a second sidewall adjacent to the first sidewall, a cap at one end of the outer housing and an outer housing reinforcement ring;
    a primary leg partially enclosed within a portion of the outer housing, the primary leg comprising a first sidewall, a second sidewall adjacent to the first sidewall, and a third sidewall adjacent to the second sidewall; and
    a secondary leg partially enclosed within a portion of the primary leg, the secondary leg comprising a first sidewall, a second sidewall adjacent to the first sidewall, and a third sidewall adjacent to the second sidewall;
    wherein the primary leg is extendable and retractable with respect to the outer housing;
    wherein the secondary leg is extendable and retractable with respect to the primary leg;
    wherein the primary leg is selectively secured to the outer housing in a fixed position by coupling the first sidewall of the outer housing to the first sidewall of the primary leg and by coupling the second sidewall of the outer housing to the second sidewall of the primary leg; and
    wherein the secondary leg is selectively secured to the primary leg in a fixed position by coupling the second sidewall of the primary leg to the second sidewall of the secondary leg and by coupling the third sidewall of the primary leg to the third sidewall of the secondary leg.

2. The apparatus of claim 1 further comprising:
a trailer coupler attached to an end of the secondary leg.

3. The apparatus of claim 1 further comprising:
a nut holder attached to an interior of the first sidewall of the primary leg and to an interior of the second sidewall of the primary leg.

4. The apparatus of claim 3 wherein the nut holder includes at least one threaded nut.

5. The apparatus of claim 1 further comprising:
a nut holder attached to an interior of the second sidewall of the secondary leg and to an interior of the third sidewall of the secondary leg.

6. The apparatus of claim 5 wherein the nut holder includes at least one threaded nut.

7. The apparatus of claim 1 further comprising:
a slidable collar surrounding a portion of the primary leg.

8. The apparatus of claim 7 wherein at least one bolt is inserted through at least one bolt hole in the collar to secure the secondary leg to the primary leg in a fixed position.

9. The apparatus of claim 1 wherein the outer housing is secured to a trailer gooseneck.

10. The apparatus of claim 1 wherein bolts are used to secure the primary leg to the outer housing in a fixed position.

11. A method for adjusting a trailer telecoupler comprising:
    extending or retracting a primary leg with respect to an outer housing, the primary leg partially enclosed within a portion of the outer housing having a cap at one end and an outer housing reinforcement ring;
    fixing a position of the primary leg with respect to the outer housing by coupling first and second adjacent sidewalls of the primary leg to corresponding first and second adjacent sidewalls of the outer housing, wherein the coupling comprises using at least one bolt in mechanical communication with at least one nut holder located within an interior portion of the primary leg;
    extending or retracting a secondary leg with respect to the primary leg, the secondary leg partially enclosed within a portion of the primary leg; and
    fixing a position of the secondary leg with respect to the primary leg by coupling second and third adjacent sidewalls of the secondary leg to corresponding second and third adjacent sidewalls of the primary leg, wherein the coupling comprises using at least one bolt in mechanical communication with a slidable collar and at least one nut holder located within the interior portion of the primary leg.

12. The method of claim 11 wherein:
fixing the position of the secondary leg with respect to the primary leg further comprises using at least one bolt in mechanical communication with the slidable collar and at least one nut attached to a nut holder located within an interior portion of the secondary leg.

13. The method of claim 11 further comprising:
attaching the outer housing to a trailer gooseneck.

14. The method of claim 11 further comprising:
attaching a trailer coupler to an end of the secondary leg.

15. The method of claim 14 further comprising:
attaching the adjustable telecoupler to a vehicle trailer coupler hitch receiver.

16. A trailer telecoupler apparatus comprising:
    an outer housing having an open end and a reinforcement ring located near the open end of the outer housing;
    a primary leg partially slideably disposed within the open end of the outer housing and having an open lower end; and
    a secondary leg partially slideably disposed within the open lower end of the primary leg;
    wherein a length of the telecoupler apparatus is selectively set by extending or retracting the primary leg with respect to the outer housing and fixing a position of the primary leg with respect to the outer housing, by extending or retracting the secondary leg with respect to the primary leg and fixing a position of the secondary leg with respect to the primary leg, or both;
    wherein fixing the position of the primary leg with respect to the outer housing comprises coupling first and second adjacent sidewalls of the primary leg to corresponding first and second adjacent sidewalls of the outer housing; and
    wherein fixing the position of the secondary leg with respect to the primary leg comprises coupling second and third adjacent sidewalls of the secondary leg to corresponding second and third adjacent sidewalls of the primary leg.

17. The apparatus of claim 16 further comprising:
a slidable collar surrounding a portion of the primary leg and configured to receive bolts to couple the second and third adjacent sidewalls of the secondary leg to the second and third adjacent sidewalls of the primary leg.

18. The apparatus of claim 16 further comprising:
at least one nut holder;
wherein the at least one nut holder is attached within an interior sidewall portion of the primary leg, within an interior sidewall portion of the secondary leg, or both.

19. The apparatus of claim 16 wherein the outer housing further comprises:
a cap on an end opposite the open end.

\* \* \* \* \*